United States Patent
Swenson et al.

(10) Patent No.: US 7,878,148 B2
(45) Date of Patent: Feb. 1, 2011

(54) PET DISH HAVING AN EXTENDED THREADED NECK RING AND SCREW-CAP LID

(76) Inventors: Seth Yin Pao Swenson, 2001 McAllister St., #310, San Francisco, CA (US) 94118; Jennifer May Swenson, 2001 McAllister St., #310, San Francisco, CA (US) 94118

(*) Notice: Subject to any disclaimer, the term of this patent is extended or adjusted under 35 U.S.C. 154(b) by 34 days.

(21) Appl. No.: 12/228,186

(22) Filed: Aug. 11, 2008

(65) Prior Publication Data

US 2009/0283047 A1    Nov. 19, 2009

Related U.S. Application Data

(60) Provisional application No. 61/128,056, filed on May 19, 2008.

(51) Int. Cl.
*A01K 7/00* (2006.01)
(52) U.S. Cl. .................................... 119/61.5
(58) Field of Classification Search ........... 220/355, 220/375, 256, 259, 711, 713; 119/61.5, 61.54–61.56, 119/72
See application file for complete search history.

(56) References Cited

U.S. PATENT DOCUMENTS

| | | | | |
|---|---|---|---|---|
| 1,836,811 | A * | 12/1931 | McNeal | 220/291 |
| 2,958,439 | A * | 11/1960 | Yochem | 220/834 |
| 3,282,477 | A * | 11/1966 | Henchert | 222/541.9 |
| 3,568,875 | A | 3/1971 | Olan | |
| 4,436,056 | A | 3/1984 | MacLeod | |
| 4,934,556 | A * | 6/1990 | Kleissendorf | 220/269 |
| 5,105,768 | A | 4/1992 | Johnson | |
| 5,150,808 | A * | 9/1992 | Hamilton | 220/375 |
| 5,209,184 | A * | 5/1993 | Sharkan et al. | 119/61.56 |
| 5,458,087 | A * | 10/1995 | Prior et al. | 119/51.5 |
| 5,765,716 | A * | 6/1998 | Cai et al. | 220/740 |
| 6,202,879 | B1 * | 3/2001 | Gericke | 220/255 |
| 6,332,553 | B1 * | 12/2001 | Yamada et al. | 220/375 |
| 7,040,499 | B1 * | 5/2006 | Reif | 220/291 |
| 7,059,492 | B2 * | 6/2006 | Giraud et al. | 220/834 |
| 7,156,253 | B2 * | 1/2007 | Ziegler | 220/375 |
| 7,287,487 | B2 | 10/2007 | Hurwitz | |
| 7,472,797 | B2 * | 1/2009 | Ostrowski | 215/306 |

OTHER PUBLICATIONS www.novalek.com/oasis/dog_products/pet_canteen/index.htm.
www.nextag.com/dog-travel-water-bowl/search-html.
www.furrytravelers.com/14.html.

* cited by examiner

*Primary Examiner*—Thomas Price

(57) ABSTRACT

One embodiment of a contiguous pet bowl and lid (30) comprising a watertight hollow utensil (60) connected to a lid (30) by a tether (21). The pet bowl is surrounded by an adjacent skirt portion (50) with a means to secure a watertight seal (40) around the rim (71). The topside aperture (71) is large enough to accommodate use by an animal. The lid (30) is sealable (41) when joined to the means to secure a watertight seal (40) retaining liquid or solid matter in any position. The lid (30) and pet bowl are also independent from a contiguous means. Other embodiments are described and shown.

7 Claims, 9 Drawing Sheets

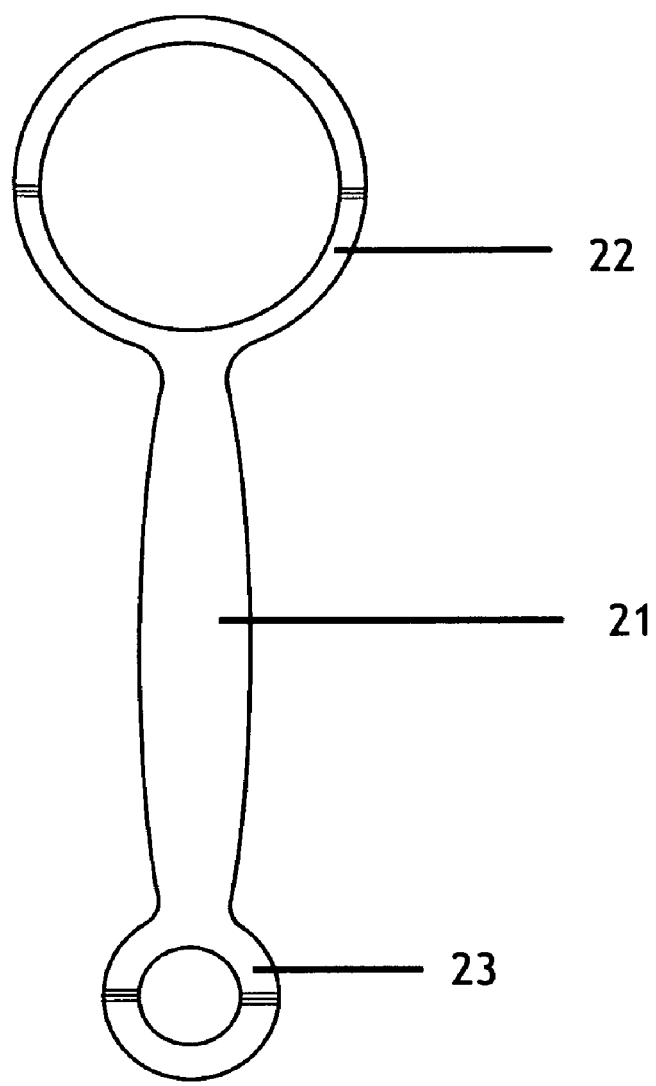
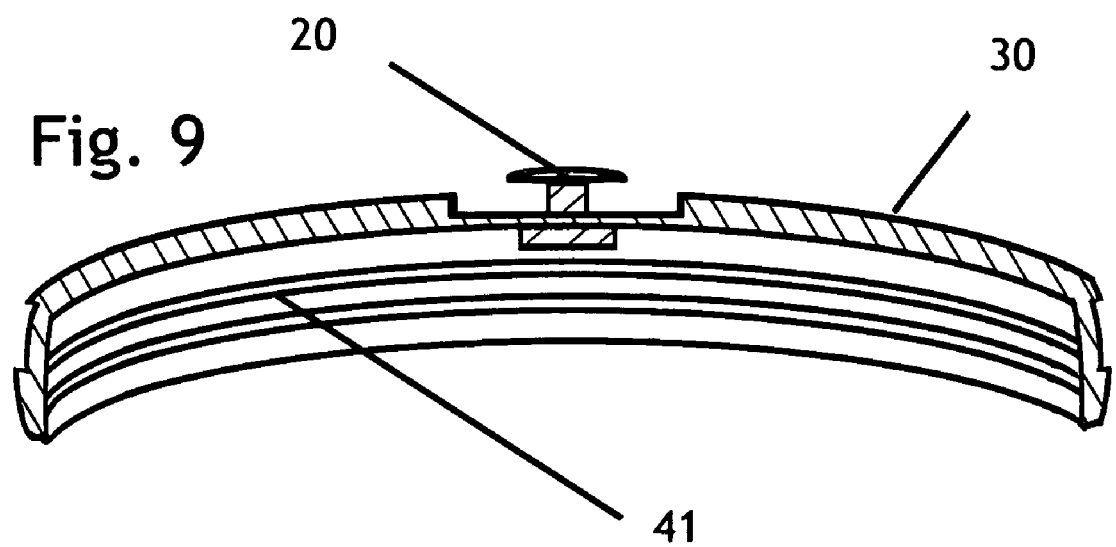

PET DISH HAVING AN EXTENDED THREADED NECK RING AND SCREW-CAP LID

CROSS-REFERENCE TO RELATED APPLICATIONS

This application claims the befit of PPA Sr. Nr. 61/128,056 filed 2008 May 19 by the present inventors, which is incorporated by reference.

FEDERALLY SPONSORED RESEARCH

Not Applicable

SEQUENCE LISTING OR PROGRAM

Not Applicable

BACKGROUND

Field

This application generally relates to pet utensils, specifically concerned with a pet bowl that holds water during transport.

BACKGROUND

Prior Art

Pet bowls are typically placed on the floor in proximity of stored bulk pet food and a water source. Traditionally a pet bowl, especially a water bowl, never leaves its location in the household, a kennel or another setting. It is common that even though a food bowl may be taken from a pet, a water bowl is left out all day in the same location, as water is vital to an animal's health.

The utility of a water bowl is limited however by its nearness to a water source because it generally does not have a means to retain liquid without spilling while transported. Typically 8 oz of water placed in a conventional pet bowl, that is, one that has a shallow concave bowl approximately 2" deep with a 4.5" aperture for an animal to drink from, spills easily. The relation between the volume of water stored in a bowl, the shallow walls of the bowl and the friction of movement while the bowl is in transport creates a wave that will inevitably overcome the rim of the bowl.

This limitation comes at a disadvantage because the trend for pets accompanying their owners or guardians while traveling is increasing. Pets are more visible joining their owners at work, hotel stays, flying, road trips, shopping, outdoor dining, and indoor and or outdoor events. Bringing food and water, especially water, along on these outings insures the health and safety of the pets. A watertight portable pet bowl addresses this growing need.

For many owners, bringing along their pet's daily water bowl poses the aforementioned limitations. Therefore, many owners resort to impromptu methods of watering their pets during travel. They use human plastic food containers with sealable lids, or recycle other human containers previously meant to hold solid products such as margarine, cottage cheese and other foods relying on shallow containers with roughly 4.5" apertures. Some lids, but not all, used with these containers are not watertight and the friction required to open the lid pops-open causing a splashing effect; spilling and wasting water when opened. Another drawback to these methods is that some animals are finicky and may not drink from a bowl that it is not their own, as some dogs will not drink from municipal dog water-fountains and the like.

If no container is available to transport water, pet owners have to buy previously filled water bottles and then search for a receptacle large enough for an animal to drink from. In situations where there is no container, the owner has no option but to pour the water straight from the bottle's neck with the hopes that the dog can get the water it needs. This results in wasting water, and is ineffectual when indoors; especially inside a car. Another solution is cupping ones hand for use as a dish. This is unsanitary, not convenient and does hold water for any length of time.

There have been attempts to design products to transport water for pets. However, the aspects known in most but not all of the prior art that are similar yet not alike to the present embodiment are proven to be limited in consumer interest. Many, but not all of the prior art, do not address the need for a watertight device that can be used in every situation indoors and outdoors. Especially a device used as the primary container for a dog to drink from inside the home and then taken to a second location, as pet owners are now treating their pets as children and taking them everywhere pets are legally allowed. Prior art manufacturing, presentation and marketability is not meeting consumer demand.

All prior art heretofore known suffer from a number of disadvantages;

(a) Inverted water bottles used in combination with a pet carrier are not watertight. The animal has access only to small drops of water and does not gain the benefit of getting a full lap of water. The device must mount on a cage to be useful and is obsolete where a cage is not available.

(b) Collapsible fold-open containers do not have watertight lids, thereby limited requiring having a second water source at the site of usage.

(c) The Spill-Resistant Pet Animal Dish, U.S. Pat. No. 4,436,056 (1984) by MacLeod does not offer a secure watertight seal. If placed sideways in a bag or in a manner that is not upright the device cannot retain liquid.

(d) The Combination Pet Food Container and Dispenser U.S. Pat. No. 3,568,875 (1971) by Olan, is not reusable as it loses its ability to seal the container after one use making the device obsolete and disposable.

(e) The Animal Canteen U.S. Pat. No. 5,105,768 (1992) by Johnson, is potentially not safe for an animal and is a choking hazard. A shoulder strap to carry the canteen is dangerous if left unattended with the animal. The shoulder strap is connected to the bowl of the canteen where the water is stored. Thereby, the head and paws are in direct proximity to the strap, increasing the potential to tangle in strap restricting the animal unintentionally.

(f) The Animal Canteen U.S. Pat. No. 5,105,768 (1992) by Johnson, is not sanitary for the human. The shoulder strap attached to the canteen is susceptible to dirt and bacteria. The easiest way for the pet to use the canteen is to place the canteen on the ground while the animal drinks. The shoulder strap by design is also placed on the ground due to the fact it is attached to the bowl of the canteen where the water is stored. Thereby the environment the canteen is set in, for example grass, sidewalk, sand, dirt etc, gets transferred to the strap. When the shoulder strap is used again, the owner's clothing is susceptible to ground contamination, as well as the mouth due to the fact that the shoulder strap is also in close proximity to the owner's face.

(g) The above mentioned Animal Canteen U.S. Pat. No. 5,105,768 (1992) by Johnson has no contiguous connection of a closure to the canteen increasing the risk of losing the closure. Without the closure the canteen becomes obsolete. Heretofore, without the said closure, the canteen does not retain its integrity as a product for pets.

(h) The Portable Water Bottle, Cup And Dish Assembly For Humans And Pets U.S. Pat. No. 7,287,487 by Hurwitz, (2007) requires many steps to access water and relies on the owner being present to hold the device upright for animal use.

(i) Portable water bottles with dishes attached to the neck of the bottle are cumbersome and unattractive. The dish extends beyond the cap of the bottle and the suggested means of transporting the water bottle is to clip it to the pet owner's belt. Thereby the pet owner carries a used dish on his or her body that is not sanitary.

(j) The above mentioned Animal Canteen U.S. Pat. No. 5,105,768 (1992) by Johnson, and The Portable Water Bottle, Cup and Dish assembly for humans and pets U.S. Pat. No. 7,287,487 by Hurwitz, (2007) lend themselves to misinterpretation as pet accessories. They do not read, that is, they do not translate at first glance that they are products for pets; their shape and presentation are not clear to the consumer and both items need proper instructions and packaging for the devices to be recognized as pet accessories. This is a limitation in the marketplace.

(k) The Pet Travel Bowl by Arnold L, Sharkan, U.S. Pat. No. 5,209,184 (1993) is not watertight. Its function relies on lying flat during transport and secured with a means to fasten to the floor of a carpeted vehicle. Thereby that embodiment becomes obsolete in situations where there is no carpeted surface available. The device is overly complicated from a manufacturing standpoint. Adhesives are required to mount the lid and foam filler is suggested to fill the device. This additive increases the price per unit thus causing limitations as proven in the marketplace where the device at this time is not visible for sale. The device is not practical as the connection between the "living hinge" or the strap that connects to the bowl of the dish keeps the lid too close to the mouth of the bowl distracting the animal from food or water.

(l) Combination containers that have two receptacles for pet food and water are cumbersome because of their size. They are not practical in situations such as in an outdoor café setting where a pet owner wants to water their pet in a discrete manner. It is not necessary to transport food and water for every excursion with a dog, especially outings that only last a short time.

(m) Some of the containers but not all described aforementioned require the user to throw out any remaining water unused by the pet during transport. These methods are not efficient if the owner wants to water their pet more than once, or is in an environment where there is not an area to find new water or dispose the unused water: as in an airport or indoor event or traveling in the car.

(n) Pre-filled foil pouches with second reservoirs to drink from are disposable making them obsolete after one use.

(o) Containers that have the capacity of holding 3 quarts of water, as in a plastic water jug with handles, and contain a splash-proof bowl, are for use primarily in cars. They are bulky in form with a utilitarian aesthetic and not convenient for use on short outings.

(p) Pet bowls made to fit in car cup-holders have pop-up lids that are splash proof but not watertight. They also require many steps to assemble. The lids are not attached to the bowl and can be lost easily. The dog bowl and human food containers are used in the same location in the car cup-holder offering opportunity for cross contamination of germs from the dog to human.

(q) Typical plastic pet bowls with sloping sides do not have a means to secure a watertight lid therefore require a second source of water during transport.

(r) Sport water bottles for humans, while convenient to carry water in any situation do not have an aperture wide enough for an animal to drink.

The present embodiment is directed to overcoming one or more of the foregoing limitations and achieving one or more of the resulting objects.

SUMMARY

In accordance with one embodiment a contiguous receptacle and top comprises a watertight hollow utensil with a topside aperture to accommodate use by an animal, surrounded by an adjacent skirt portion, and a top that is sealable when joined retaining liquid or solid matter in any position.

ADVANTAGES

Thus several advantages of one or more aspects are to provide;

(a) a utensil that can be used as a primary container or water bowl for a pet and or used by the pet in other locations outside of the home, (b) a utensil that can be used as a pets primary dish at home or while traveling, so the pet is comfortable in every setting drinking from the same bowl, (c) a utensil that does not lose its integrity in one or more aspects if the lid is omitted, in that it still remains relevant in one or more aspects as a pet bowl and can still be understood and used as a pet bowl without the lid, (d) a simplified portable utensil, with no assembly required by end user, with an aperture wide enough for a pet to drink or eat, (e) a technically simple utensil that is lightweight and easy to open and close, and carry anywhere.

(f) a top to the utensil that secures a watertight seal, allowing the utensil to retain liquid in any position, (g) a sanitary and convenient method of providing liquid or solid matter to an animal indoors and outdoors, that is easy to clean and dishwasher safe, (h) a contiguous manner of the utensil so that the receptacle and top maintain continuity for safety and convenience, (i) a means for containing water indoors and outdoors where there is no source for attaining or disposing water, (j) an easily recognized self-governed utensil for animals, specifically dogs, that the human or animal need no training to use, (k) the contiguous manner of the means to secure the exact fitting of a lid and the lid that results in one or more aspects to transport the utensil without compromising the connection of the lid to the central aperture, (l) a tether that results in the contiguous manner connecting the means to support the exact fitting of a top to the hollow utensil by lassoing the rim and typically connected to the top of the lid or another method, (m) a tether in varying dimensions that is in proportion so that the lid can be placed under the base of the utensil while in use by the animal, so that the animal is not affected by the lid,
(n) a utensil that can seal water and food from insects and other animals,
(o) a utensil that holds water from a known source, when water from an unknown source may be contaminated,
(p) a utensil that can hold ice cubes for an animal to cool down in hot weather,
(q) a utensil that can retain solid matter in any position such as food,
(r) a utensil with a sloping skirt starting from the central aperture to the base that provides the classic appearance of a typical pet bowl and or provides a stable base that resists tipping,
(s) an open base showing the convex manner of the bowl that allows the user to hold onto the inner sloping sides for a firmer grip,
(t) sloping sides that create a ring shaped open base reducing the bottom surface area, having non-skid means,
(u) a utensil that may be used by many types of animals,
(v) a utensil that is economic and simple to manufacture, distribute and package, but is durable and has a long life cycle for added value to the consumer,
(w) a utensil that improves the quality of life of animals, and conforms to legal requirements for providing water to pets that are kept inside cars while the car is parked,
(x) a precise means to attach the lid with, but not limited to, a threaded rim,
(y) a threaded rim screw cap, and or other means to secure a watertight seal,
(z) a utensil that is fun and "buzz worthy" in a utilitarian market, meaning that it has the attributes that create word-of-mouth advertising and is interesting enough to be published in formats other than pet media-publications. Therefore enhancing that market to spur new innovations.

These and other advantages of one or more aspects will become apparent from a consideration of the ensuing description and accompanying drawings.

DRAWINGS

Figures

FIG. 1 shows a top perspective view.
FIG. 2 shows a cross-sectional side view.
FIG. 3 shows an exploded view.
FIG. 4 shows a front view.
FIG. 5 shows a bottom perspective view.
FIG. 6 shows the bottom view.
FIG. 7 shows the top view of the lid and tether.
FIG. 8 shows the top view of the tether.
FIG. 9 shows the cross-sectional view of the lid.

DRAWINGS

Reference Numerals

Continued on Page 8

Ref 20. Tether Nub
Ref. 21. Tether
Ref 22. Tether Rim Band
Ref. 23. Tether Nub Band
Ref. 30. Lid
Ref. 40. Means To Secure A Watertight Seal Outside of Rim
Ref. 41. Means To Secure A Watertight Seal Inside Lid
Ref. 50. Sloping Skirt
Ref. 60. Concave Bowl
Ref. 61. Center Point
Ref. 70. Base Ring
Ref. 71 Rim

DESCRIPTION OF SPECIFIC EMBODIMENTS

Referring to FIG. 1 the present embodiment is one improvement, the means to secure a watertight seal 40 or seal 40 on a typical pet bowl having an adjacent skirt portion or sloping sides 50 and a topside circular aperture or rim 71. It can consist of one or more materials that are legally food safe and or other materials that can retain liquid without leaking such as High Density Polyethylene (HDPE), Polyethylene Terephthalate (PET), Polypropylene, vinyl, nylon, metal, glass, ceramics, rubber, leather, various plasticized materials, laminated cardboard, waterproof fabrics, and or etc. The preferred manufacturing process is plastic injection molding, however ceramic injection molding, metal pressing, and a variety of other processes that are suitable for specific and alternative material is appropriate.

Referring to FIG. 1 one improvement of the present embodiment is a seal 40 that encompasses the pet bowl's top aperture 71 that when joined by an opposite yet equal means to secure a watertight seal FIG. 9 page 8/8—41 or seal 41 it retains liquid and or solid matter. The term watertight means to construct or fit two items together so that water cannot enter or escape.

Referring to FIG. 3 the preferred means to secure the exact fitting of the top is a threaded outside-rim 40 attached to the bowl to secure a screw-cap lid 30. However this and other means to secure an exact fitting are suitable. The preferred fitting of the threaded outside-rim is to use either continuous threads or lugs 40. The present embodiments preferred design but not limited to is a threaded outside-rim 40 that is the male to the screw-cap lid's female threaded lid FIG. 9 page 8/8—41. Alternatively the embodiment can be designed as a female rim to a male screw-cap fitting as in a typical prior art thermos fittings. However other methods of securing a watertight seal are suitable without the addition of a threaded rim. The present embodiment can consist of any of the before mentioned manufacturing materials, preferably a food safe plastic. It is preferred that the means to retain a watertight seal consist of the same material as the chosen material of the concave bowl when manufactured however, other alternative methods are acceptable.

Referring to FIG. 2 the concave bowl or hemispherical basin 60 that is open on the top rim 71 and wider than it is deep is used chiefly for holding liquids or foods. The sloping skirt 50 starts at the base of the means to retain a watertight seal 40 and angles to the base ring 70 that is larger than the rim 71 circumference. The sloping skirt 50 is concentrically equal in length to allow the bowl to balance on a flat surface. The concave center of the bowl 61 is equally proportionate dipping inward from the rim 71 and settling to the lowest point 61 that is higher than the base ring 70 of the sloping skirt 50. This attribute centers the liquid in the middle of the bowl at all times no matter how much water is in the bowl allowing the animal the best location to drink the liquid, unlike other containers where the owner is required to tip the utensil to help the pets drink water in any unreachable area of the container.

Referring to FIG. 6 it is apparent that the pet bowl is concentrically equal starting at the center point 61 and rounding outward and down to create the concave bowl 60 then turning a sharp angle back up forming the sloping skirt 50 to end at the widest point of the utensil to the base ring 70 providing a tip proof bowl.

Referring to FIG. 2 the space between the lowest center point 61 and the base ring 70 is preferred to be in direct relation to the depth of the seal 40 outside of the rim 71. All dimensions and proportions can vary according to the material used in manufacturing. Different dimensions can vary to adjust accordingly to the weight, durability and aesthetics of the pet bowl and lid. The pet bowl 60 and lid 30 are preferred to be circular in design, however dimensions throughout can be adjusted throughout to supply a variety of sizes and shapes on behalf of the consumer as well as to accommodate different pet needs.

Referring to FIG. 5 the preferred bottom of the concave bowl is open exposing the convex manner of the basin 60 and the base ring 70 of the adjacent sloping skirt. The sloping skirt 50 and the base ring 70 are manufactured thick and strong enough to withhold the pressure of everyday use without cracking or chipping. The edge of the base ring 70 is smooth to avoid snagging and personal injury to the owner and or the pet. However the base could be closed forming a solid disk on the bottom of the bowl of the sloping skirt 50. The embodiment is preferred to have an open bottom which allows a hand to grab onto the sloping skirt 50 for use as a handle.

Referring to FIG. 3 the present embodiment retains its integrity as a pet bowl even without the lid 30 and tether 21 as it remains functional and understandable for humans and pets. The present embodiment retains its integrity for use as a portable pet bowl without the tether 21 as it remains watertight without the tether 21 and thus can be used in the same manner. It is preferred that all three segments of the pet bowl, tether 21, and lid 3 are used together however there are several alternative ways to use the bowl without the combination of all the aforementioned segments.

Referring to FIG. 3 one improvement of the present embodiment is to add a typical prior art sports bottle tether and lid. The tether rim band 22 fastens to the fixed nature of the rim 71 and the fixed nature of the tether nub 20 without the use of any form of adhesive. The tether 21 limits the range of movement of the lid 30 allowing only a short radius. The tether rim band 22 fits tight around the bottom section of the rim 71 under the mean to secure a watertight seal on the outside of the rim 40. The tether rim band 22 fits tight around the bottom of the rim 71 but is not fixed as it can rotate around the rim however, it does not move away from the rim itself.

Referring to FIG. 9 page 8/8 the tether nub 20 creates an anchor for the tether nub band 23 allowing an axle for the wheel like lid 30 to pivot in order to turn and secure to the rim 71.

Referring to FIG. 8 page 8/8 the tether 21 is to be one piece of material to consist of one or more of the aforementioned materials. The tether 21 is a pliable strap that can be repeatedly bent 360 degrees in either direction (not shown) but strong enough so the lid 30 does not disconnect from the rim 71. The width of the tether is preferred to be thick enough to hold comfortably with a hand or finger. The tether can be the width and shape illustrated in FIG. 8 and can still be used in the same manner with alternative shapes of the edge, as in a straight line or other shapes and widths according to the material they consist of.

Referring to FIG. 4 the lid 30 is closed on the pet bowl by seal 40 and inside the lid 41. It is preferred that the lid 30 contain a screw-closure, which is a mechanical device that is rotated on and off of the rim to close or finish a container. However other means to secure a watertight seal are acceptable. The lid 30 is located at the top of the utensil and is moveable at will. The lid 30 is connected contiguously to the rim 71 by the tether 21. The lid 30 is to consist of one or more of the aforementioned materials.

Referring to FIG. 7 the preferred way in which the lid 30 is attached to the tether 21 is by the tether nub band 23. The tether nub 20 rests in the center of the lid 30 inset from the top of the lid 30. However other means to connect the tether 21 to the lid 30 are acceptable.

Referring to FIG. 9 the tether nub 20 is anchored under the lid 30 with another round nub of material to reinforce the connection. This allows the lid 30 to pivot in such a way that it rotates in one direction while the tether 21 stays in place. The lid is engineered to be cost-effective, to provide an effective seal or barrier, to be compatible with the contents, to be easily opened by the consumer, easily closable by the consumer, and to comply with product, package, and environmental laws and regulations.

In conclusion, the specific embodiments described are as follows.

Figure 3:
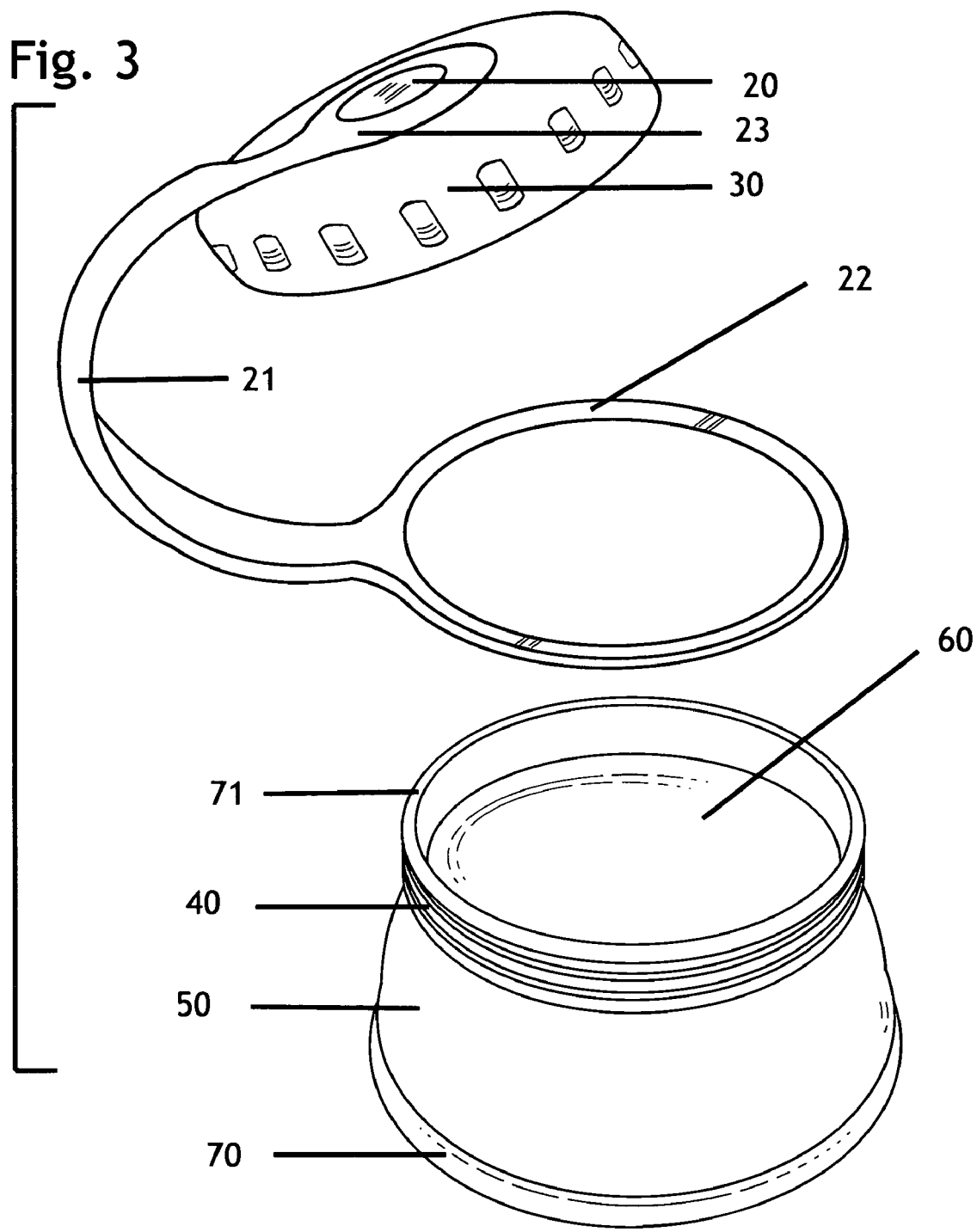

FIG. 3 shows an exploded view illustrating:
 a. the contiguous pliable tether,
 b. how the said tether is sandwiched with the lid and the bowl,
 c. the pliable manner of the tether to create a hinge,
 d. the round tether nub, and how it is centered on the lid,
 e. the tether nub band and how it is centered on the tether nub sandwiched between the lid and tether nub,
 f. the tether rim band and how it is centered on the means to secure a watertight seal,
 g. the concave bowl,
 h. the means to support a watertight seal with an adjacent sloping skirt,
 i. the base ring and how it is larger than the rim circumference,
 j. the proportionate manner of the lid, tether rim band and the rim.

Figure 4:
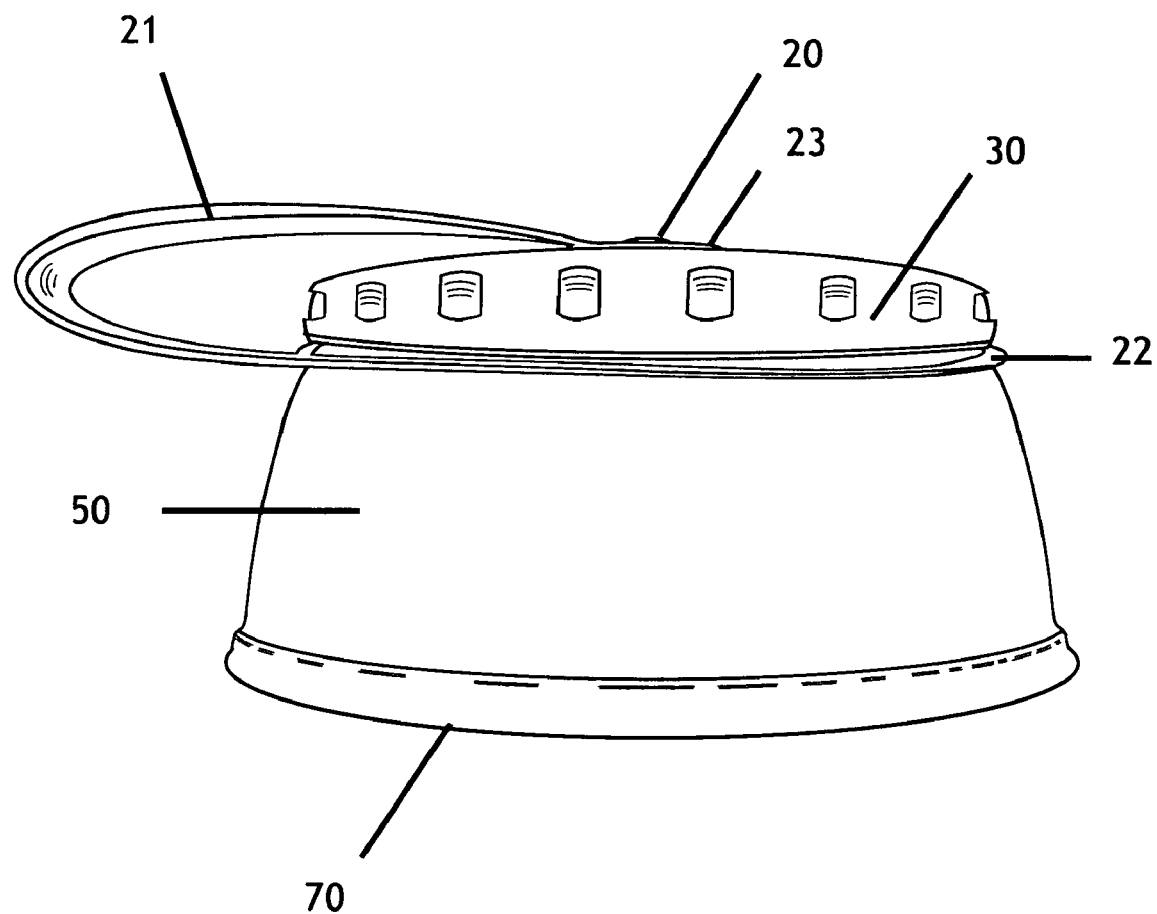

FIG. 4 shows a front view illustrating:
 a. the lid connected to the utensil with adjacent sloping skirt,
 b. a contiguous pliable tether connecting the lid to the means to support a watertight seal,
 c. the sloping skirt that extends from the means to support a watertight seal to a base ring.
 d. the tether nub connecting the tether to the lid.

Figure 5:
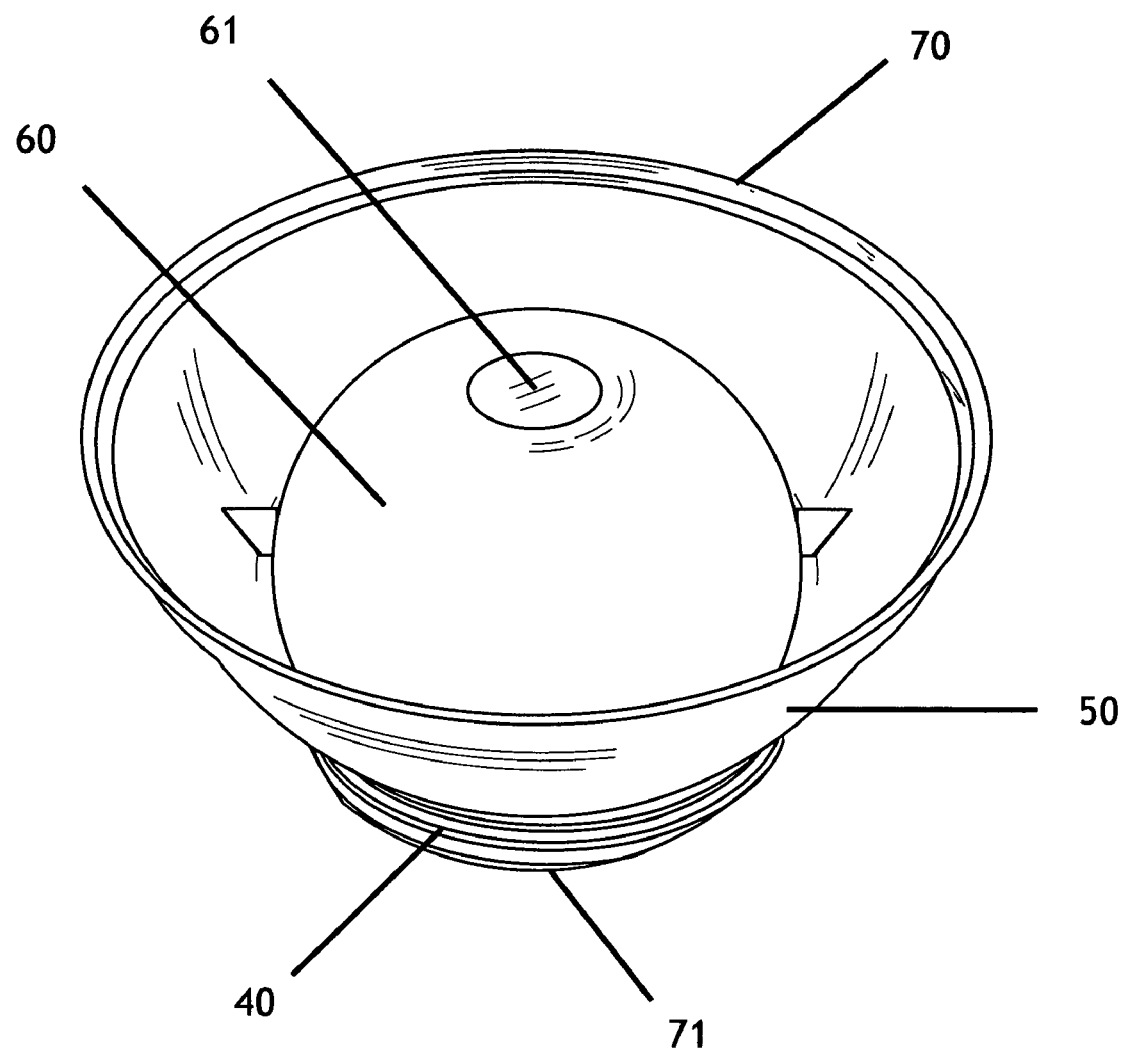

FIG. 5 shows a bottom perspective of the concave bowl illustrating:
 a. the base ring and how it is the widest aspect of the utensil,
 b. the surrounding sloping skirt and how it angles from the base ring to the means to secure a watertight seal, c. the basin shape and the center point at the bottom of the hollow container,
d. the open ended aspect of the bottom,
e. the means to secure a watertight seal,
f. how the base is open ended and not solid.

Figure 6:
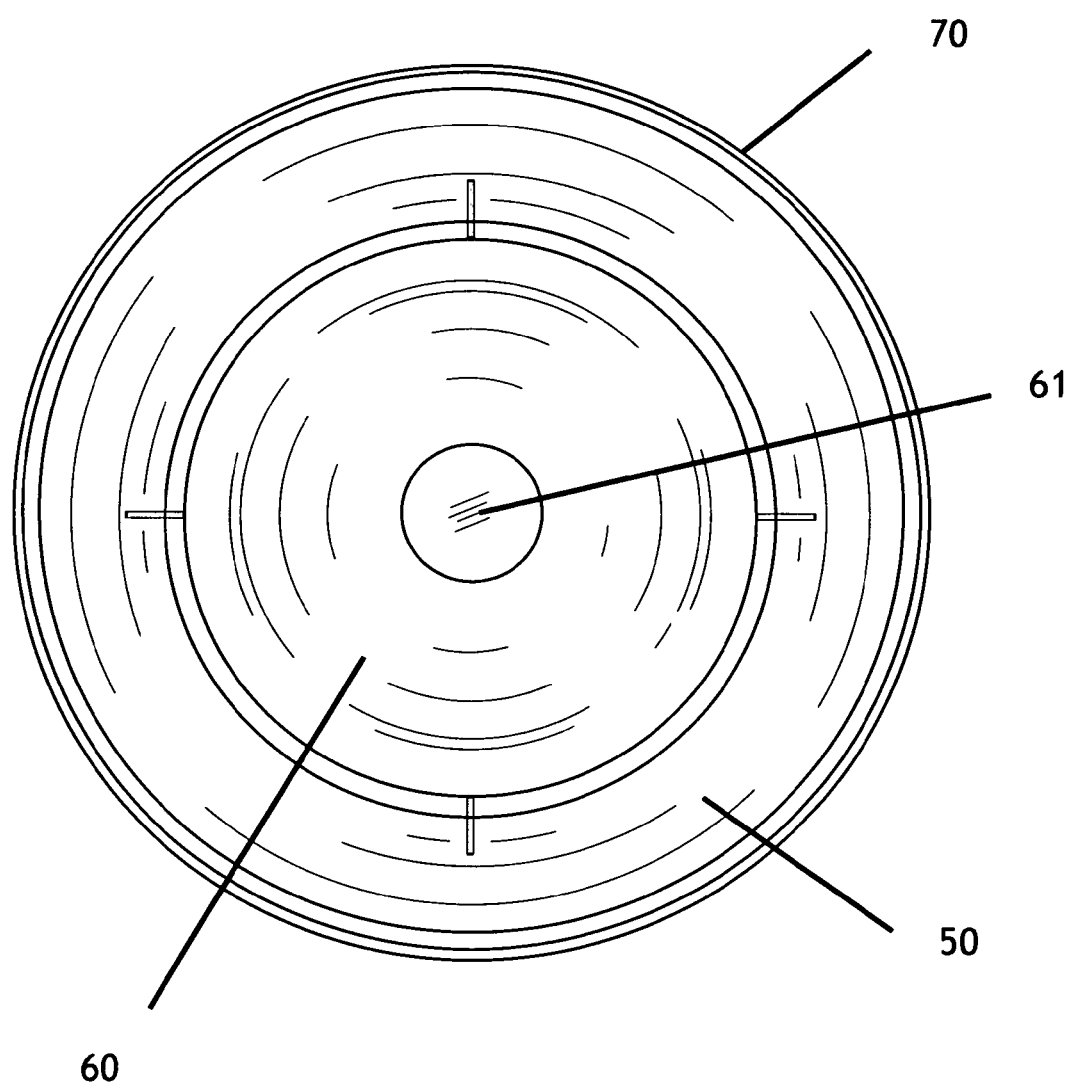

FIG. 6 shows the bottom view of the bowl illustrating:
a. the base ring and how it is the widest point of the utensil,
b. the concave bowl and how it is centered equally from the center point of the bowl to the base ring creating concentric circles,
c. the sloping skirt and how it is equal in proportion with the base ring and the concave bowl,
d. how the base is open ended and not solid.

Figure 7:
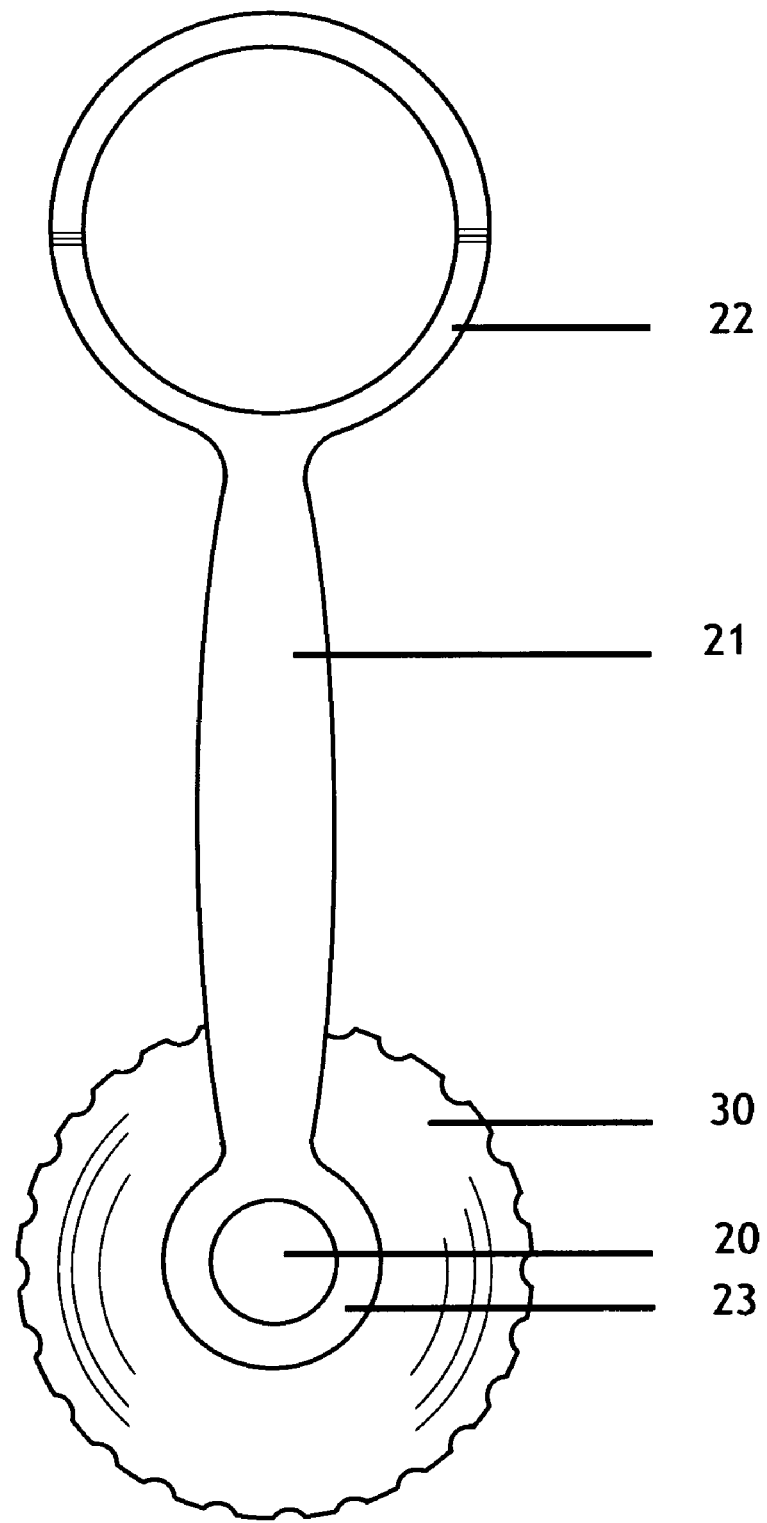

FIG. 7 shows the top view of the lid and tether illustrating:
a. the contiguous connection of the pliable tether to the lid by the tether nub,
b. the pliable strap and how it can hinge in a manner to lie flat,
c. the way that the tether nub band is centered on top of the lid sandwiched between the tether nub and lid creating a wheel-and-axel model,
d. the open circular shape of the tether rim band as it is in proportion to the size of the lid,
e. the proportion in length of the tether between the tether rim band and that of the tether nub band.

FIG. 8 shows the top view of the tether illustrating:
a. the difference in size of the tether rim band and the tether nub band,
b. how the sizes are in direct proportion with the rim and the tether nub.

FIG. 9 shows the cross-sectional view of the lid illustrating;
a. the tether nub and how it is inset in the center of the lid,
b. the mushroom shape of the tether nub,
c. the anchor under the tether nub under the lid,
d. the means to secure a watertight seal inside lid,
e. the width of the means to secure a water tight seal inside the lid in proportion with the width of the means to secure a watertight seal on the rim.

Figure 10:
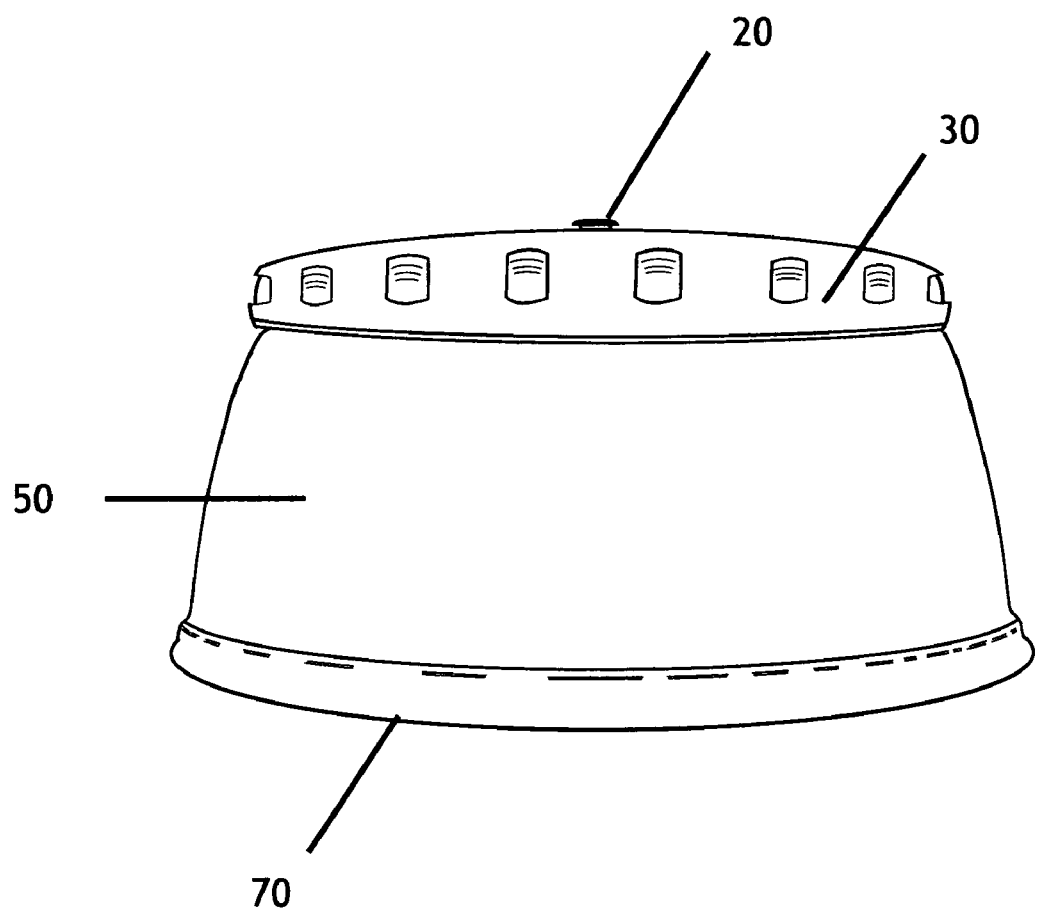

FIG. 10 shows the front view of the pet bowl with lid illustrating:
a. the lid connected to the utensil with adjacent sloping skirt,
b. The sloping skirt that extends from the means to support a watertight seal to the base ring,
c. The tether nub,
d. The base ring and how it is wider than the lid.

SUMMARY

The present embodiment is an improvement on a standard pet bowl with a sloping skirt. Its distinct features are unlike any of the prior art references above as it has a means for securing a watertight seal on the rim of the bowl that enables the use of a screw-top lid or another acceptable form of a watertight closure. This feature allows it to hold liquid or matter while in transport. The inside of the present embodiment is a bowl shape that is important to the pet because water will always be available at nose level in the center of the bowl. This frees the owner from having to tip the utensil to the side for the animal to drink.

The present embodiment is intended for use indoors and outdoors, it is included but not exclusive too a niche industry such as hiking or camping that limits marketing potential. The embodiment is intended to be used as the dogs primary water dish at home to then be flexible enough to be taken from its normal spot, usually on the floor, to the next location that the owner chooses. To further its convenience for mass consumption it has a tether connecting the lid to the bowl creating a contiguous one-unit item that holds water in the same container the dog drinks. It allows the consumer the convenience and safety of keeping the lid with the bowl at all times. However if the lid is lost, the pet bowl still maintains its integrity as a stationary pet water bowl unlike other prior art that does not maintain their value if the lid is lost. The tether can be eliminated from the present embodiment, as the embodiment would still maintain its usefulness as a portable water dish.

The present embodiment is inexpensive to produce with simple materials that are readily available for mass production. It is to be manufactured in food safe plastics, ceramics, metals and or other materials that are logical for everyday usage and will be marketed on the same shelf space as standard pet dishes.

Operation of Specific Embodiments

Figure 1:
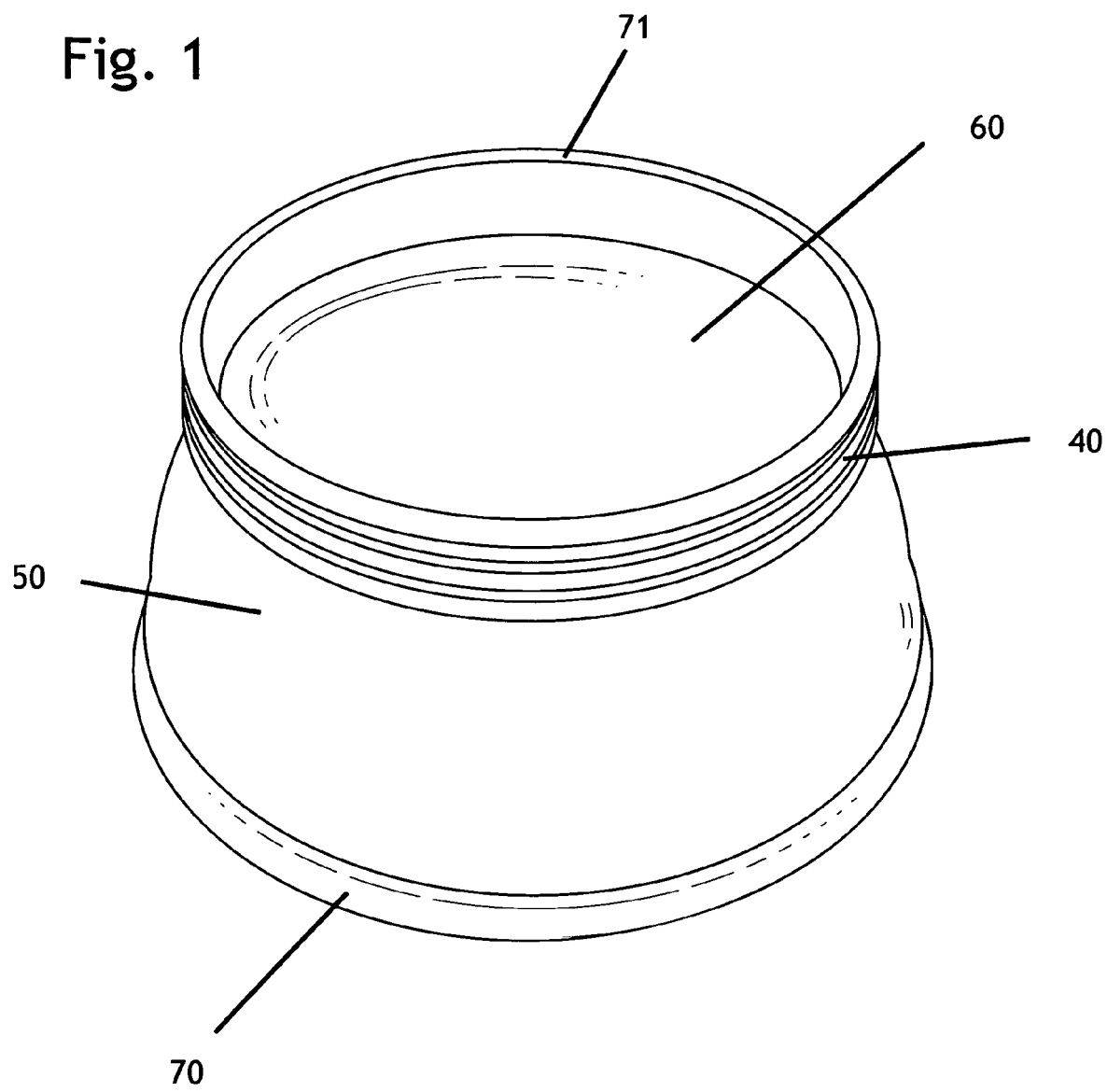
FIG. 1 shows a top perspective view illustrating:
 a. the inside of a concave bowl with the means to secure a watertight seal,
 b. the sloping skirt that extends from the means to support the watertight seal to the base ring,
 c. the base ring and how it is larger than the rim circumference.
Figure 2:
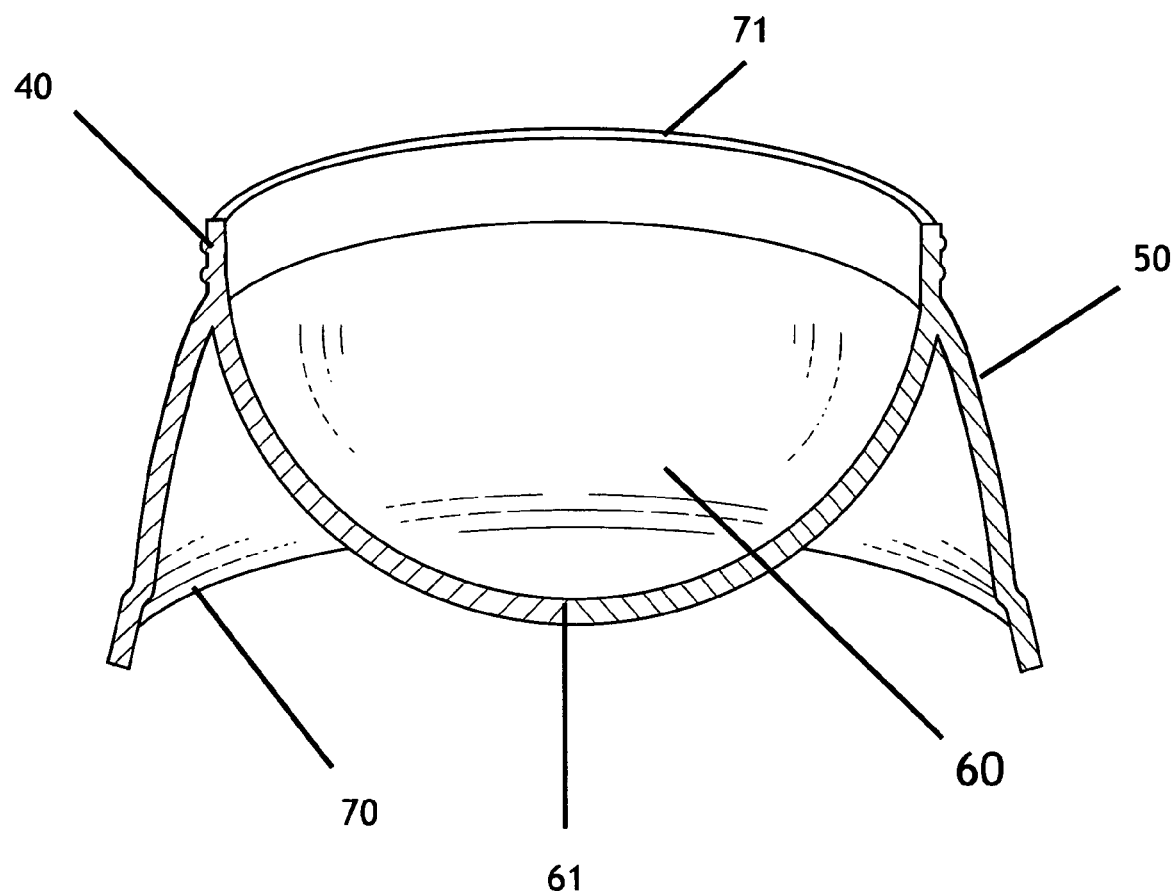
FIG. 2 shows a cross-sectional side view illustrating:
 a. the sloping skirt of the bowl,
 b. the means to secure a watertight seal,
 c. the concave manner of the bowl which dips to a center point of the bowl that is higher than the base ring, allowing space between the deepest point of the bowl and the surface it is placed on,
 d. how the base is open ended and not solid.

Referring to FIG. 3 page 3/8 the sloping skirt 50 can be held by hand or laid on the ground while the lid 30 is then rotated and or urged in an upward direction to disconnect from the seal 40. The lid 30 maintains proximity to the rim 71 by the tether 21. The tether 21 limits the radius of movement of the lid 30 from the rest of the embodiment to keep the lid 30 in a convenient manner to the embodiment. The lid 30 can either be placed to the side of the embodiment or referring to FIG. 2 it can rest in the space under the concave bowl 61. The embodiment is now presented without the lid 30 providing an open mouth with a hollow basin to pour fresh water or solid matter inside such as food. The primary use in this example is for water. Referring back to FIG. 1 after completing filling the basin or concave bowl 60 to a desired level, the user places the lid 30 back on the rim 71 then rotates or urges the lid 30 to create the watertight seal. The embodiment is now ready to be taken to a second location without any hesitation that water will spill no matter what angle the embodiment is held.

CONCLUSIONS, RAMIFICATIONS, AND SCOPE

Accordingly the reader will see that the present embodiment far outperforms in form and function in comparison with prior art. More specifically this embodiment is the most logical for a pet and owner for transporting water in a container that combines a pet bowl with a lid. By using a container that is in the shape of a typical pet bowl and adding a means to secure a watertight seal, it solves the problem of watering a pet outside of the home. It simplifies the task for the owner by eliminating the need to carry two items, a water bottle and a container, to water their pet. The added feature of the tether adds value as the lid is easily available at all times.

In keeping with the current trend of pets traveling to multiple destinations with their owner or guardian, in some cases overnight, this embodiment addresses the growing need to have a pet bowl with a lid. Animals on the move will have fresh water not only at the dog-park and beach, but in new places, as hotels and outdoor restaurants and other legal places to accommodate animals are catering to animal patrons.

The embodiment is an improvement of typical pet bowls and a pet does not need training to use it. For instance, some pets are afraid of outdoor water fountains that have a lower apparatus exclusive for dogs to drink. The present embodiment is convenient because the owner knows they always have water available for their pet in any situation, in a container that their pet is comfortable using. The present embodiment gives pet owners who are germ conscious a container to provide fresh and clean water to their pet in any situation. The lid provides protection from bugs, debris, and other unwanted substances or animals.

The owner can leave the present embodiment alone with the pet, because the bowl is tip-proof and stands alone with no need for a human to hold it. It is an instant solution to a thirsty pet where the pet can drink immediately from the embodiment because water is already available for the pet in a utensil with a mouth big enough for the animal to drink from naturally.

In indoor environments, the pet is guaranteed a resource of water as the present embodiment is self-contained and there is no need to find a water source. In indoor environments, the utensil is self contained; after the animal is finished drinking water, there is no need to find a place to throw-out the remaining water, as in previous prior art references, or by using other impromptu devices such as cupping ones hand, using a paper cup, or pouring water straight from a water bottle, making it an easy solution and natural choice for the owner.

The tether attached to the rim of the embodiment is useful keeping the lid and bowl in close proximity. The concave bowl centers the water in the bottom of the bowl at all times. The owner does not have to tip the container to help the pets drink water in any unreachable area of the container no matter how much water remains in the bowl.

The present embodiment is essentially a portable water bottle for pets much like a human sports water bottle but with a large enough opening for the pet to drink. The container has a large opening so that it is easy to clean, eliminating unpleasant odors or tastes and contributing to the health of the pet.

The present embodiment is ergonomic and easy to pick up off the ground, due to the pet bowl shape and tether connecting the lid to the bowl. The bowl has a skirt that comes down from the rim at an angle down to the base. The base is open-ended exposing the bottom of the bowl to enable the user to grab the bowl securely onto the base to water the dog, making it fast to use. The simplicity of the structure has few components in order to reduce the need for repairs if any.

The present embodiment is small enough and lightweight for a person to carry in a backpack or by hand. It is simple and easy to use, just fill with water and cap off.

Many pets drink water from puddles, sewers, rivers-sea-lake and other sources that may be contaminated and unhealthy to pet. The present embodiment allows dogs to drink water from a pet bowl that comes from a known source. It is helpful for sick pets to have personal water that is clean and to prevent other pets from contamination by a sick pet. The present embodiment offers clean water for a pet that needs medication. It is a fun way to water pets all year long in many different situations becoming a staple for a pet owner.

The present embodiment assists in fulfilling legal requirements that all pets left in unattended vehicles have water or other liquids available to them at all times, thus improving the quality of life for pets. It has an opening large enough for many different types of pets of many different sizes making it convenient to carry food as well as liquids.

The present embodiment is economical to manufacture giving it an advantage to be produced in many different styles and colors. The slope of the skirt can change shapes for aesthetic appeal, either jetting out or creating an indent for variety. The tether can very in width and length and in shape. The tether can be imprinted and or die cut with a variety of logos or character shapes to increase brand value and licensing opportunities.

The base rim can have a notch or indent for the tether to slip under allowing the embodiment to lay flat on a surface if the lid is placed under the concave bowl. The lid can change in shape and design with respect for different hand sizes and with different patterns for the ridges around the edge for grip. Adding another concave bowl and lid to the embodiment to carry both water and food is possible. The lid could contain a compartment to hold other pet supplies. An added disposable dish could be included to enable the owner to have a clean compartment at all times while traveling.

The price point will be at a level for repeatable purchase due to the simplicity of this design that can vary in an unlimited amount of color combinations and is fun and unique, yet easily understood that it is a pet accessory. The potential of repeat purchase is an advantage as consumers will want to buy several units for individual pets, one for each car, one for second homes, the office and other places that having the present embodiment in convenient.

The market is open with little competition as the present embodiment offers the best solution for carrying water for a pet while in transport. There is no dog dish on the shelf at his writing that offers a watertight lid. The present embodiment is an improvement of two proven designs in the marketplace with potential compared with the production and sales of human water bottles and classic pet bowls.

Although the description above contains many specifications, these should not be construed as limiting the scope of the embodiments but as merely providing the illustrations of some of the presently preferred embodiments. For example, the lid, the tether and the slope of the embodiment can have other shapes.

Thus the scope of the embodiments should be determined by the appended claims and their legal equivalents, rather than by the example given.

Thus the scope of the embodiments should be determined by the appended claims and their legal equivalents, rather than by the example given.

I claim:

1. A pet dish having an extended threaded neck ring and screw-cap lid, comprising:
    (a) a hollow receptacle resembling a conical frustum having an inner cavity made from a rigid material, and
    (b) a topside aperture of the said inner cavity that connects to said extended neck ring protruding upward from said topside aperture, and
    (c) outside horizontal threads circumnavigating and spiraling upward said extended neck ring, and
    (d) said topside aperture diameter is larger than the height of said pet dish, and
    (e) a screw-cap lid that interlocks with threaded neck ring.

2. A pet dish having an extended threaded neck ring and screw-cap lid in accordance with claim 1 wherein said hollow receptacle resembling a conical frustum made from a rigid material having an inner cavity is tangent to said topside aperture of said hollow receptacle resembling a conical frustum.

3. A pet dish having an extended threaded neck ring and screw-cap lid in accordance with claim 1 wherein said topside aperture diameter is at a length that is accessible for an animal to acquire food and water by placing said pet dish on a surface while an animal lowers head towards receptacles said topside aperture.

4. A pet dish having an extended threaded neck ring and screw-cap lid in accordance with claim 1 wherein said extended neck ring comprises:
    (a) an outside surface with said outside horizontal threads circumnavigating and spiraling upward said extended neck ring to secure said screw-top lid, and
    (b) said extended neck ring diameter is larger than the height of said pet dish apparatus, and (c) said extended neck ring topside protruding upward from topside aperture with outside horizontal threads is parallel to base perimeter of said pet dish, and (d) said outside horizontal threads circumnavigating spiraling upward said extended neck ring terminate approximately near or at the rim.

5. A pet dish having an extended threaded neck ring and screw-cap lid in accordance with claim 1 wherein bottom side is comprised of:

(a) said hollow receptacle resembling a conical frustum having an inner cavity made from a rigid material bottom side is the edge perimeter of said receptacles said conical frustum wall, and (b) said hollow receptacle resembling a conical frustum having an inner cavity made from said rigid material edge perimeter of the wall is the base, and (c) said hollow receptacle resembling a conical frustum having an inner cavity made from a rigid material outside of said inner cavity resembles a trough housed between the inside of said edge perimeter of said hollow receptacle resembling a conical frustum having an inner cavity made from a rigid material and the said hollow receptacle resembling a conical frustum having an inner cavity made from a rigid material wall and outside of said inner hemisphere cavity whereas the bottom is open, and (e) the height of the pet dish having an extended threaded neck ring and screw-cap lid is smaller then the length of said topside aperture diameter, and (f) said base diameter is larger than said topside aperture diameter, and (g) said base perimeter edge can resemble a circle, square, hexagon, and or any variation of straight sides and or rounded sides.

6. A pet dish having an extended threaded neck ring and screw-cap lid in accordance with claim 1 wherein said screw-top lid comprises:

(a) said screw-cap lid comprising a removable cover comprised of a disc shaped topside having a perpendicular neck ring at its edge circumference, and (b) said perpendicular neck ring having internal horizontal threads spiraling downward sized to mate as the female counterpart to the male said extended neck of said receptacle to seal said topside aperture of said receptacle, and (c) said internal horizontal threads spiraling downward terminates approximately near or at said rim of screw-cap neck rim, (h) said screw-top lid when flipped horizontally fits under the said inner cavity whereas the said screw-top cap diameter and neck ring width can be stored under said inner cavity nestled under inner cavity bottom side diameter and neck ring width.

7. A method of sealing a pet dish having an extended threaded neck ring and screw-cap lid in accordance with claim 1 comprising the steps of:

(a) a rotating urging clockwise of said screw-cap interlocking said internal horizontal threads spiraling downward of the said screw-top cap with said outside horizontal threads circumnavigating said extended neck of said topside aperture spiraling upward, and (b) said rotating urging ceases at the point where the said rotating urging clockwise of said screw-cap is secured into a locked position, and (c) said locked position is the end point when the said neck of the said receptacle and said neck of screw-top cap have locked such that said screw-cap lid and said extended neck have sealed said inner hemisphere cavity of said receptacle, and (d), said screw-cap and said receptacle are completed the result of which is the said pet dish retains its integrity in locked position until said screw-cap is urged in a counterclockwise orientation, and (e) wherein, said locked position stores food and water in said inner cavity without losing the integrity of said locked position, and (f) said lock position secures food or water is said pet dish when rotated on any axis in any angle.

* * * * *